2,873,107
Patented Feb. 10, 1959

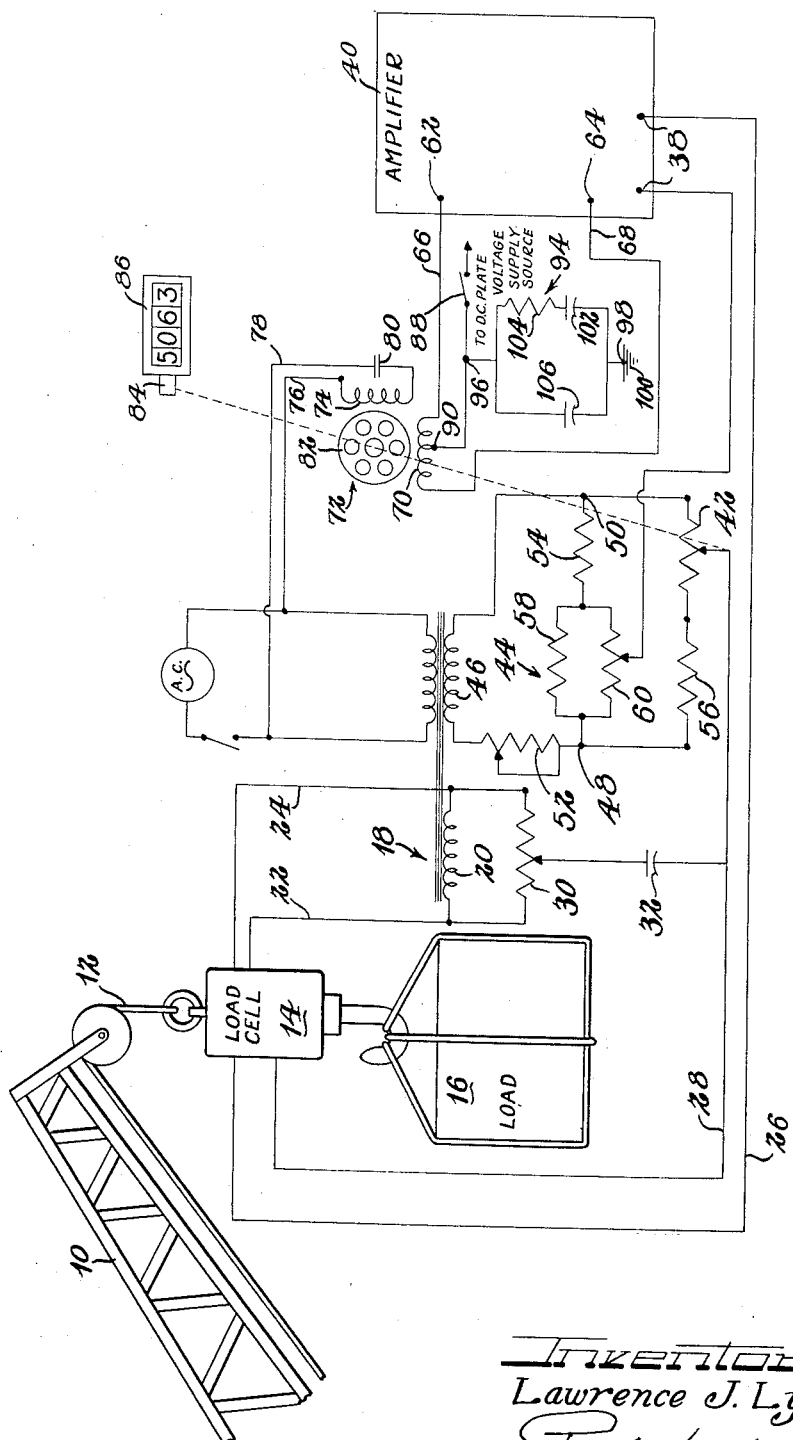

2,873,107
WEIGHING SCALE SYSTEM

Lawrence J. Lyons, Davenport, Iowa, assignor to Fairbanks, Morse & Co., Chicago, Ill., a corporation of Illinois Application May 17, 1955, Serial No. 508,905

10 Claims. (Cl. 265—70)

This invention relates to a weighing scale system, and relates particularly to an electronic weighing scale having an electrical network of a character to enable accurate indication of the load weight in respect to swinging, oscillating or vibrating loads.

In electronic scales heretofore developed, it has been exceedingly difficult to accurately weigh oscillating or swinging loads. For example, with an electronic scale having a load cell connected in a crane hook so that the load to be lifted is carried by the load cell and having an indicator driven in accordance with the output voltage of the load cell, difficulty is experienced when the load is swinging or oscillating, in that the magnitude of the load cell voltage varies in accordance with load oscillations and causes the indicator to constantly change its reading. This prevents an accurate reading of the indicator. Likewise, with platform type electronic scales having a load cell supported platform and having an indicator positioned in accordance with the load cell output voltage, if a vibrating load is placed on the scale, the indicator reading will be continuously changing to make accurate readings impossible. As will be hereinafter more fully explained, the present invention overcomes these difficulties, and enables electronic weighing systems to accurately indicate the correct weight even when the load is vibrating or oscillating.

In general, with the electronic scale of the present invention, a load cell is provided, which produces an output voltage proportional to the load carried by the load cell. If the load weight is oscillating, the instantaneous voltage output of the load cell will follow the load oscillations. The load cell voltage is fed through an amplifier to the control phase of a two phase electric motor, the power phase of the electric motor being energized from a suitable A. C. power source. A balance bridge is provided to produce a balancing voltage in phase opposition to the load cell voltage so that the difference in voltage between the load cell voltage and balance bridge voltage (hereinafter called the error signal) is applied through the amplifier, to the control phase. The balance bridge includes a potentiometer driven by the motor to vary the amount of opposing voltage. Thus, when a load is placed on the scale and the balance bridge is not producing any opposing voltage, the total load cell voltage is amplified and fed to the control winding to operate the servo motor in a direction which will move the potentiometer in the balance bridge and increase the opposing voltage. When the motor has operated a sufficient amount so that the opposing voltage equals the load cell voltage, the input error signal to the amplifier reaches zero value, and the motor stops operating. In summary, the system thus far described is a self balancing circuit arrangement.

If the load on the load cell is swinging or oscillating, the load cell will vary in magnitude, and cause the motor to operate first in one direction and then in the opposite direction in an effort to maintain the system in electrical balance. An indicator or counter is also connected to rotate with the servo motor, so that under these conditions of swinging loads, the indicator will also be rotated back and forth. In order to stop motor operation and stop indicator movement, a "hold" switch is provided in series with the control winding of the two phase motor, and in series with the plate circuit of the final stage of the amplifier. Hence when this switch is opened, the control phase is deenergized to stop motor operation.

With the arrangement as thus far described, the motor will stop quickly upon opening the hold switch, but the reading at which the indicator stops is not necessarily the accurate load weight, since the accuracy of the reading would depend upon which instant during the swinging of the load that the hold switch is opened. In order to prevent this, a null seeking network is connected in a manner to continue D. C. current flow at a diminishing rate through the plate circuit of the final amplifier stage. By slowly decreasing the D. C. plate voltage, the A. C. error signal, which passes through the control winding of the servo motor, is still amplifier by the final stage but at a decreasing rate. This network comprises a series connected resistor and capacitor paralleled by a second capacitor. The network is connected in series between ground and the point at which the B plus potential is applied to the control winding and final amplifier stage. With this arrangement, when the hold switch is closed so that the motor and indicator follow the swing of the load, the capacitors are both charged with D. C. potential. When the hold switch is opened, the capacitors discharge at a predetermined time rate so as to retain D. C. potential on the plates of the final amplifier stage. The plate voltage will gradually diminish and at the same time cause the amplified error signal to be gradually reduced in magnitude. This gradual reduction in magnitude of the error signal causes the control motor and indicator to gradually reduce their oscillating movement until they stop rotation altogether. At this time, due to the averaging effect of gradually reducing the error signal, the final indicator reading accurately indicates the true scale load.

Accordingly an object of this invention is to provide an electronic voltage measuring system which is adapted to accurately measure voltage signals having a periodic variation in magnitude.

Another object of this invention is to provide a weighing scale system which is adapted to accurately measure a load weight even if the load is oscillating.

A further object of the invention is the provision of an electronic weighing scale having a null seeking network, whereby indicator movement is gradually diminished until an accurate weight reading is had even when an oscillating load is carried by the scale.

A still further object of this invention is the provision of a weighing scale having a control motor, indicator, amplifier, a hold switch connected to deenergize the control motor, and electrical network connected to retain the control motor in an operative condition for a certain time period after the hold switch is opened.

These and other objections and advantages will become readily apparent as the description proceeds and is read in connection with the accompanying drawing, wherein the single view is a schematic showing of the electronic weighing system operatively associated with a crane type scale.

In the drawing numeral 10 indicates a crane boom having a load lifting and supporting cable 12 connected at one end to a load cell 14, which supports the load 16. Load cell 14 is of conventional construction and may be, for example, a Baldwin S. R. 4 strain gauge type load cell, produced by Baldwin Lima Hamilton Corp. Load cell 14 is supplied with alternating current from power transformer 18 by means of secondary winding 20 and leads 22 and 24. As is well known in the art, load cell 14 produces an A. C. output voltage between leads 26 and 28 proportional to the stress produced in the load cell by the load carried thereby. Thus in the crane scale arrangement shown in the drawing, load cell 14 produces a voltage which is proportional to the weight of load 16, providing the load mass is stationary and not oscillating. If, however, the suspended load is oscillating, as upwardly and downwardly on the crane hook, the load cell voltage between leads 26 and 28 will vary in accordance with the load oscillation. In other words, if the load is moving downwardly in its oscillatory path, the load cell voltage will be increasing, and when the load starts moving upwardly in its oscillatory path, the load cell voltage will decrease. Hence, with the load oscillating, the magnitude of the load cell voltage will first increase and then decrease about a median value (assuming the load is oscillating about a median point).

Due to the inter-element capacitance between leads 26 and 28 and other elements of the load cell, a voltage displaced 90° from the primary load cell voltage may also be present between leads 26 and 28. This voltage which is called a quadrature voltage, must be balanced out in order to prevent the amplifier (hereinafter described) from being saturated to adversely affect its operation. To balance out the quadrature voltage a potentiometer 30 and capacitor 32 are provided, with the potentiometer 30 connected across secondary winding 20 and condenser 32 connected between lead 28 and the movable contact of the potentiometer. Thus the movable contact is positioned to tap off enough voltage from potentiometer 30, which voltage is shifted in phase 90° by condenser 32, to exactly balance out the quadrature voltage.

Lead 26 is connected directly to one of the input terminals 38 of amplifier 40, while lead 28 is connected to the movable contact of potentiometer 42 in balance bridge circuit 44. Bridge 44 is a Wheatstone bridge, which is energized by means of secondary transformer 46 connected to the bridge at terminals 48 and 50 through an adjustable resistor 52. The Wheatstone bridge is made up of resistors 54 and 56, potentiometer 42, and the parallel combination of resistor 58 and potentiometer 60. The movable contact of potentiometer 60 is connected to the other one of the input terminals 38 of amplifier 40. The function of balance bridge 44 will be hereinafter explained.

Inasmuch as the particulars of the amplifier do not form a part of the present invention since the type of amplifier may be made in any convenient conventional structure, the amplifier is shown schematically in block form having input terminals 38 and output terminals 62 and 64. For convenience, it may be assumed that a push-pull type of amplifier has been chosen, and the plates of the two vacuum tubes (not shown) in the last stage are connected respectively to an associated one of the output terminals 62 and 64. The remainder of the plate circuit of this last stage is shown in detail so that the operation of the control motor and null seeking network can be understood. The output terminals 62 and 64 are connected over leads 66 and 68 respectively to the center-tapped control winding 70 of the two phase motor, generally indicated at 72. Motor 72 has a power winding 74 supplied with A. C. current by leads 76 and 78. A condenser 80 is provided in lead 78 to shift the phase of the voltage in power winding 74 as is conventional in two phase motors. Thus, the rotor 82 of motor 72 will rotate in one direction or the other depending on the phase direction of the error voltage supplied to amplifier 40, since the push-pull amplifier stage will cause current flow in the center-tapped control winding 70 in one direction or the other depending upon the phase direction of the input signal supplied to its input terminals 38. Rotor 82 of motor 72 is mechanically connected to the movable contact of potentiometer 42 and connected to the drive shaft 84 of a conventional Veeder Root type counter 86.

An explanation of the operation of the system as thus far described will now be made. The values of the potentiometers and resistors making up balance bridge 44 are selected so that a no voltage or zero potential condition is present in the balance bridge between the movable contacts of potentiometers 42 and 60, when the movable contact of potentiometer 42 is positioned adjacent one end of the potentiometer (a zero position). When the movable contact of potentiometer 42 is moved away from the one end of the potentiometer, a voltage is produced between the movable contacts of potentiometers 42 and 60, the magnitude of the voltage being proportional to the extent of movement of the movable contact of potentiometer 42. This voltage developed between the movable contacts of the balance bridge is in phase opposition to the load cell voltage. Thus with the movable contact of potentiometer 42 at its zero position, all of the load cell voltage will appear at the input 38 of amplifier 40, but with the movable contact displaced from its zero position, the load cell voltage will be opposed by the balance bridge voltage so that only the difference voltage (error signal) appears at the amplifier input. As previously described, the movable contact of potentiometer 42 is driven by motor 72. Thus in weighing operation when a load is placed on the load cell, the load cell voltage is amplified to produce current flow through the control winding 70 to rotate motor 82. The direction of rotation of the motor causes the movable contact of potentiometer 42 to increase the balance bridge voltage, and thereby reduce the input to the amplifier (i. e. reduce the error signal). When motor 82 operates a sufficient amount to reduce the error signal to zero, the motor will stop rotation, since no signal voltage is then impressed on the control winding 70. The counter 86 which is driven by rotor 82, will also have been driven a sufficient amount to indicate the load weight in pounds, when the opposing voltage and load cell voltage are equal. Thus it will be seen that counter 86 indicates the extent of motor operation and the extent of displacement of the movable contact of potentiometer 42 from its zero position. Also when the electrical system is in balance, the counter indicates the load weight.

In order to stop motor operation and thereby hold the counter 86 against further movement, a "hold" switch 88 is provided between the center tap 90 and the D. C. plate voltage supply source. When hold switch 88 is opened, the D. C. plate voltage supply source is disconnected from the output terminals 62 and 64 of amplifier 40, and therefore the tubes in the output stage of the amplifier are rendered non-conductive. Since these tubes are then non-conductive, no A. C. signal will appear in the plate circuits to cause control motor operation, even if an error signal is present at the grids of the push-pull amplifier stage to indicate that the electrical system is not in balance. Thus it will appear from the foregoing description, that hold switch 88 can be opened at any time to stop motor and indicator operation. The hold switch allows the scale operator an advantageous degree of operational control over the weighing system. However, with the weighing scale system as thus far described, opening hold switch 88 when a swinging load is carried by the load cell will not necessarily stop the counter at an accurate weight indication. In fact, it is unlikely that the indicator will indicate the accurate load weight, since the only way in which an accurate load weight can be indicated is to open the hold switch at the instant during which the load cell voltage is exactly proportional to the true weight. Experience, as well as the theoretical laws of probability, indicates that errors are nearly always present in the weight reading. When an oscillating load is imposed on crane scale installations, inaccuracies as great as 20 scale graduations have been noted with a scale having a total of 1000 graduations.

An important feature of the present invention is the provision of the null seeking system now to be described. As seen in the drawing, the null seeking network, generally indicated at 94, has one terminal 96 connected between center tap 90 of control winding 70, and the hold switch 88. The other terminal 98 of the null seeking network is connected to ground at 100. In the network 94 a condenser 102 is connected in series with resistor 104, this series arrangement being paralleled by a second condenser 106. When hold switch 88 is closed to complete the plate circuit of the amplifier 40 over terminals 62 and 64 through control winding 70, condensers 102 and 106 are charged by the D. C. plate voltage. When hold switch 88 is opened to disconnect the D. C. supply source, the plate voltage at the output terminals 62 and 64 is not immediately dropped to zero, since condensers 102 and 106 continue to supply D. C. potential to these terminals. Since condenser 106 is connected between ground and terminals 62 and 64, through control winding 70, this condenser will discharge to produce D. C. current flow through the plate circuit in a relatively short time. On the other hand, condenser 106 will discharge through resistor 104 at a much slower rate and also maintain D. C. plate voltage at terminals 62 and 64 at a diminishing rate for a period of time after hold switch 88 is opened. Thus amplifier 40 does not immediately cut off the amplified error signal upon opening the hold switch, but it continues to amplify the error signal (the magnitude of the error signal being representative of the extent of oscillation of the load), but at a decreasing rate so that the back and forth rotating motion of the motor is gradually reduced until the motor remains stationary. Thus, the null seeking circuit serves to average out the effect of the varying error signal and bring the counter to rest at the true load weight.

The time duration during which the plate supply voltage is maintained on amplifier 40 after the hold switch is opened, is largely determined by the value of the capacitors 102 and 106 and the value of resistor 104. With the tubes in the final stage of push-pull amplifier 40 being of R. C. A. type 5687, the best operating combination for the null seeking network 94 was found to exist when condensers 102 and 106 were electrolytic condensers having a capacity of 40 microfarads and resistor 104 was 1000 ohms.

While the amplifier stage with which the null seeking network is associated, is shown as a push-pull amplifier, it should be appreciated that the null seeking network will work equally well with a single tube amplifier stage. Furthermore, various other changes and alterations may be made in the electrical circuit arrangements and components without departing from the scope of the present invention as defined in the appended claims.

What is claimed is:

1. In a weighing scale system, a load cell producing a first voltage representative of a load weight, an amplifier connected to said load cell, a motor having a control winding connected to the output of said amplifier, a balance bridge having a potentiometer driven by said motor, said balance bridge producing a second voltage proportional to the extent said potentiometer is driven from an initial position, means connecting said balance bridge, load cell and amplifier with said second voltage in opposition to said first voltage whereby the difference between said voltages appears in an amplified condition at the amplifier output, a weight indicator driven by said motor, a plate circuit in said amplifier, said plate circuit including said control winding, a switch in said plate circuit, an electrical network means connected to said plate circuit, and a capacitor in said network adapted to retain plate voltage at a diminishing rate in said plate circuit after said switch is opened.

2. In a weighing scale system, a load cell producing a first voltage representative of a load weight, an amplifier connected to said load cell, a motor having a control winding connected to the output of said amplifier, a balance bridge having a potentiometer driven by said motor, said balance bridge producing a second voltage proportional to the extent said potentiometer is driven from an initial position, means connecting said balance bridge, load cell and amplifier with said second voltage in opposition to said first voltage whereby the difference between said voltages appears in an amplified condition at the amplifier output, a weight indicator driven by said motor, a plate circuit in said amplifier, said plate circuit including said control winding, a switch in said plate circuit, a series connected resistor and capacitor connected to said plate circuit, said capacitor being charged when said switch is closed and said capacitor discharging through said resistor to retain plate voltage at a diminishing rate when said switch is opened, and a second capacitor connected in parallel with said series connected resistor and capacitor, said second capacitor also being charged when said switch is closed and being discharged when said switch is opened.

3. In a weighing scale system, means producing a signal voltage representative of load weight, an amplifier adapted to amplify said signal voltage, said amplifier having a plate circuit therein, a motor connected to the output of said amplifier, an indicator operated from said motor, a switch in said plate circuit arranged to open said plate circuit, and a capacitor connected to said plate circuit so as to be charged by the plate voltage, said capacitor discharging through said plate circuit when said switch is opened.

4. In a weighing scale system, means producing a signal voltage representative of load weight, an amplifier adapted to amplify said signal voltage, said amplifier having a plate circuit therein, a motor connected to the output of said amplifier, an indicator operated from said motor, a switch in said plate circuit arranged to open said plate circuit, a capacitor connected to said plate circuit so as to be charged by the plate voltage, said capacitor discharging through said plate circuit when said switch is opened, and a resistor connected in series with said capacitor whereby said capacitor discharges at a predetermined rate.

5. In a self-balancing electronic weighing scale system having load cell means producing a voltage proportional to scale load and having a voltage opposing circuit to balance out the load cell voltage, a motor operatively connected to said voltage opposing circuit, an indicator operated from said motor, an amplifier for operating the motor in accordance with the combined voltage output of the load cell and the voltage opposing circuit, a plate circuit in said amplifier, a switch actuable to open the plate circuit, a resistor and capacitor network, and leads connecting said network to said plate circuit so that a capacitor of said network discharges through the plate circuit when said switch is opened.

6. In a weighing scale system, load cell means producing a signal voltage representative of a load weight, said signal voltage varying in magnitude in accordance with load weight oscillations, an amplifier connected to amplify said signal voltage, an indicator operated from said motor, a motor connected to the output of said amplifier, said motor being rotated back and forth when said signal voltage changes in magnitude according to load oscillations, a plate circuit in said amplifier, a switch connected to open said plate circuit and stop motor operation, and a resistor capacitor network connected to said plate circuit and arranged to continue signal voltage amplification at a diminishing rate after said switch is opened, whereby back and forth movement of the motor is gradually reduced to zero.

7. In a voltage measuring system having means producing a signal voltage to be measured, an amplifier for amplifying the signal voltage, a plate circuit in said amplifier, a motor connected to the output of the amplifier and being driven by the amplifier output to an extent proportional to the value of said signal voltage, an indicator operated from said motor, a switch in said amplifier plate circuit operable to stop motor operation, and a network connected with the amplifier and adapted to retain the motor in an operative condition but at a diminishing rate of operation when said switch is operated.

8. In a voltage measuring system having means producing a signal voltage to be measured, an amplifier arranged to amplify the signal voltage, a motor having a control winding connected to the output of said amplifier and being operated to an extent proportional to the value of said signal voltage, an indicator driven by said motor, a switch connected to said motor and operable to de-energize said control winding of said motor, and an electrical network connected to said motor and arranged to supply electrical power to the motor at a diminishing rate after said switch is opened.

9. In a voltage measuring system having means producing a signal voltage to be measured, an amplifier connected to amplify the signal voltage, a plate circuit in said amplifier, means operated by the output of said amplifier to an extent representative of the value of said signal voltage, a switch in said amplifier plate circuit operable to render the amplifier inoperative in its signal amplifying function, and electrical means connected to said amplifier to continue the amplifying function but at a diminishing rate after said switch is operated.

10. In a voltage measuring system having means producing a signal voltage to be measured, a balancing circuit producing a voltage in opposition to said signal voltage, an amplifier for amplifying the combined voltage output of said balancing circuit and signal voltage producing means, a motor connected to the amplifier output, said motor being rotated an amount proportional to the value of said signal voltage, an indicator operated from said motor means in said balancing circuit driven by said motor to increase the value of said opposing voltage in accordance with the extent of motor operation, said motor being rotated back and forth when said signal voltage is periodically changing in value, a plate circuit in said amplifier including a winding for said motor, a switch in said plate circuit arranged to open the same, and a resistor capacitor network connected to said plate circuit to supply a diminishing plate voltage when said switch is opened, the back and forth rotation of said motor being gradually reduced in magnitude when said switch is opened.

References Cited in the file of this patent

UNITED STATES PATENTS

| | | |
|---|---|---|
| 2,255,601 | Schmitt | Sept. 9, 1941 |
| 2,616,683 | Le Fevre | Nov. 4, 1952 |
| 2,645,447 | Clark | July 14, 1953 |
| 2,675,222 | Clark | Apr. 13, 1954 |
| 2,677,086 | McAdie | Apr. 27, 1954 |
| 2,766,981 | Lauler et al. | Oct. 16, 1956 |